W. B. JACKSON.
LIQUID MEASURING DEVICE.
APPLICATION FILED MAY 9, 1910.
983,058.
Patented Jan. 31, 1911.
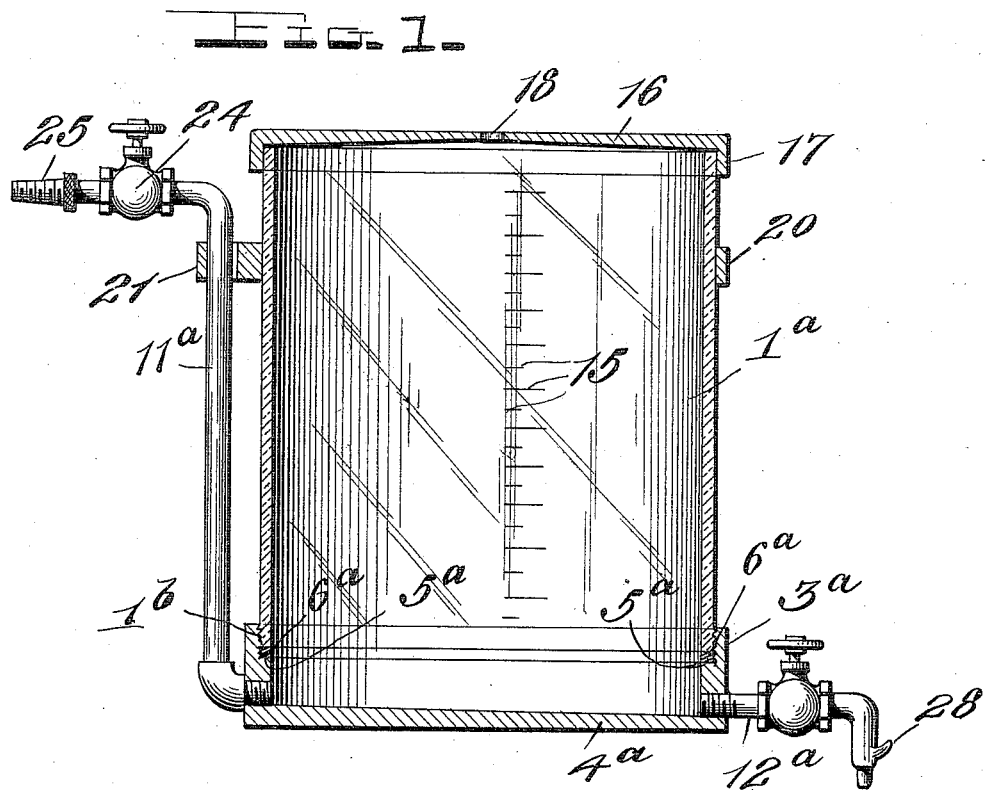
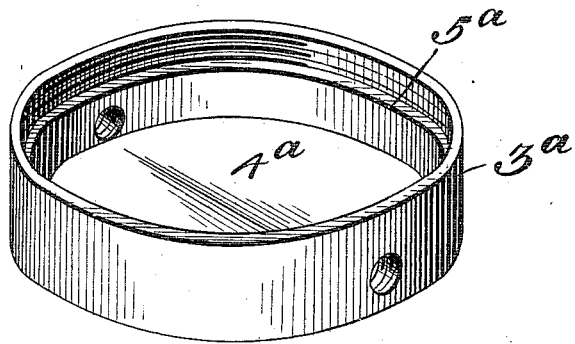
Witnesses
Chas. L. Griesbauer.
E. M. Ricketts.
Inventor
W. B. Jackson,
By Watson E. Coleman.
Attorney
THE NORRIS PETERS CO., WASHINGTON, D. C.

UNITED STATES PATENT OFFICE.

WILLIAM B. JACKSON, OF DES ARC, ARKANSAS.

LIQUID-MEASURING DEVICE.

983,058. Specification of Letters Patent. Patented Jan. 31, 1911.

Application filed May 9, 1910. Serial No. 560,296.

*To all whom it may concern:*

Be it known that I, WILLIAM B. JACKSON, a citizen of the United States, residing at Des Arc, in the county of Prairie and State of Arkansas, have invented certain new and useful Improvements in Liquid-Measuring Devices, of which the following is a specification, reference being had to the accompanying drawings.

This invention relates to improvements in liquid measuring devices for use in connection with supply tanks containing oil, milk or other liquids to be measured while being dispensed.

The object of the invention is to provide a simple and practical device of this character which is inexpensive in construction and by means of which the liquid may be accurately measured as it is drawn from the tank or other liquid container to which the invention is connected.

The invention consists in the construction, combination and arrangement of devices hereinafter described and claimed.

In the accompanying drawings, Figure 1 is a vertical central sectional view of a measuring device constructed in accordance with my invention. Fig. 2 is a detail perspective view of the base member thereof.

In accordance with my invention I provide a body $1^a$ of tubular form and which is constructed of glass, the lower portion thereof being provided with external screw threads $1^b$. The said body is also provided with a vertical series of graduation marks 15, which may indicate in units of measure or fraction thereof, it being understood that the measuring vessel may be of any size and for use in connection with a tank or liquid container of any size and description.

In connection with the body $1^a$ of the vessel, I provide a cylindrical base member $4^a$, which constitutes the bottom of the measuring vessel and is provided with an upstanding annular flange $3^a$, the upper portion of which is provided with interior screw threads for engagement by the threaded lower portion of the body $1^a$, the said flange being also formed with an internal annular shoulder $5^a$, between which and the lower edge of the body $1^a$ is placed a packing ring $6^a$, which is made of rubber or other suitable elastic material, and which coacts with the screw threaded connection between the body $1^a$ and the base member to effect a perfectly tight joint between them. The open upper end of the body $1^a$ is closed by a removable cover plate 16 which has a depending annular flange 17 which extends around the upper portion of the body $1^a$, the said cover plate being also provided with a centrally disposed vent opening 18.

The flange $3^a$ of the base member $4^a$ is provided at diametrically opposite points and immediately above the bottom of the said base member with screw threaded openings into one of which is screwed a faucet or other outlet device $12^a$, the discharge nozzle of the said faucet being here shown as provided with a hook 28 to receive a bail or bucket or the like which may be employed to receive the liquid drawn from the measuring vessel. An inlet pipe $11^a$ has its lower end screwed in the opening in the flange $3^a$ opposite that to which the faucet $12^a$ is connected and the said inlet pipe has a vertical portion which is arranged parallel with and spaced a slight distance from one side of the measuring vessel, the upper end of the said inlet pipe being outturned, horizontally extended, and provided with a screw threaded tapered terminal portion 25 adapted to be screwed into connection with a suitable supply tank, reservoir, or the like, the said horizontal outturned portion of the inlet pipe being also provided with a valve 24 by means of which the communication between the tank or reservoir and the measuring vessel may be established or cut off, at will, and as may be required.

A band 20 extends around the body $1^a$, of the measuring vessel and is provided on one side with an off-set portion 21 which has a vertical opening through which the inlet pipe $11^a$ extends, the said band connecting the upper portion of the measuring vessel to the inlet pipe at a point near the upper end of the latter and hence serving to strengthen the connection between the measuring vessel and the said inlet pipe, and preventing injurious stress from being exerted at the lower end of the said inlet pipe where the latter is connected to the base member of the measuring vessel.

Having thus described my invention, I claim—

The herein described measuring vessel comprising a vertical transparent body having graduation marks, a cylindrical base member having an upstanding flange in which the lower end of the body is fitted, said flange having an annular shoulder on its inner side, a packing ring on said shoulder and against which the lower edge of the said body bears, an inlet pipe having its lower end connected to the flange of the base member, said inlet pipe having a vertical portion spaced from the said body, a band extending around the said body and having a member provided with an opening through which said inlet pipe extends, and a valve-controlled outlet pipe for the said measuring vessel and connected to the said flange of the said base member.

In testimony whereof I hereunto affix my signature in the presence of two witnesses.

WILLIAM B. JACKSON.

Witnesses:
W. B. FRITH,
ERWIN BETHEL.